(12) United States Patent
Lan (10) Patent No.: US 11,566,645 B2
(45) Date of Patent: Jan. 31, 2023

(54) POSITIONING AND FASTENING SYSTEM FOR COMBINING PLANKS

(71) Applicant: Li-Sheng Lan, Taoyuan (TW)

(72) Inventor: Li-Sheng Lan, Taoyuan (TW)

( * ) Notice: Subject to any disclaimer, the term of this patent is extended or adjusted under 35 U.S.C. 154(b) by 345 days.

(21) Appl. No.: 16/935,215

(22) Filed: Jul. 22, 2020

(65) Prior Publication Data

US 2022/0025915 A1 Jan. 27, 2022

(51) Int. Cl.
*F16B 5/02* (2006.01)

(52) U.S. Cl.
CPC .......... *F16B 5/0208* (2013.01); *F16B 5/0275* (2013.01)

(58) Field of Classification Search
CPC .......... Y10T 403/75; F16B 19/02; F16B 5/02; F16B 5/0208; F16B 5/0275
USPC ...... 403/408, 408.1; 52/796.1, 787.1, 506.05
See application file for complete search history.

(56) References Cited

U.S. PATENT DOCUMENTS

| | | | | |
|---|---|---|---|---|
| 2,700,172 A * | 1/1955 | Rohe | ........................ | F16B 5/02 285/215 |
| 2,853,112 A * | 9/1958 | Poupitch | ............... | F16B 5/0208 411/105 |
| 4,076,430 A * | 2/1978 | Crook, Jr. | ................ | B66C 1/34 403/243 |
| 8,152,952 B2 * | 4/2012 | Whitworth | ................ | B23P 6/00 156/293 |
| 2008/0056809 A1 * | 3/2008 | Kielczewski | ......... | F16B 5/0233 403/118 |
| 2011/0008125 A1 * | 1/2011 | Moon | ....................... | F16B 5/02 411/108 |
| 2018/0265181 A1 * | 9/2018 | Goverdhan | ............. | B64C 11/14 |
| 2019/0277319 A1 * | 9/2019 | Ponter | ..................... | F16B 31/02 |
| 2020/0096024 A1 * | 3/2020 | Chan | ..................... | F16B 11/006 |
| 2022/0275816 A1 * | 9/2022 | Honge | ..................... | F16M 1/00 |

FOREIGN PATENT DOCUMENTS

GB 2527156 A * 12/2015 ............. B64C 1/069

* cited by examiner

*Primary Examiner* — David P Bryant
*Assistant Examiner* — Darrell C Ford
(74) *Attorney, Agent, or Firm* — Bruce Stone LLP; Joseph A. Bruce (57) ABSTRACT

A positioning and fastening system for combining planks comprises at least two planks, each of which has a junction surface at one end plane and a clamping surface at the other end plane wherein the junction surface on each of the planks is designed to have a positioning counterbored hole, the clamping surface is designed to have a pre-burying counterbored hole opposite to the positioning counterbored hole, and both the positioning counterbored hole and the pre-burying counterbored hole allow a bolt hole to penetrate in between. For combining the two planks based on the opposite junction surfaces, the two positioning counterbored holes allow a positioning pin to be plugged in and between for positioning, the positioning pin develops a bolt passage centrally, the nut hole inside each positioning counterbored hole of the two planks pre-buried a nut in which a screw hole is prepared centrally, and a junction bolt penetrates from one nut at anyone of the two planks through the bolt passage and is fixed in the screw hole of the nut at the other plank. Based on above components, combining two planks is completed fastly and accurately.

8 Claims, 8 Drawing Sheets

POSITIONING AND FASTENING SYSTEM FOR COMBINING PLANKS

BACKGROUND OF THE INVENTION

1. Field of the Invention

The present disclosure relates to the field for combining objects, particularly a positioning and fastening system for combining boards, planks, panels, slabs, slates etc. which are simplified in structure and represented as planks as in the following for a fast and stable operation.

2. Description of the Prior Art

Generally, planks are taken as common components of compartments which are created from limited space effectively for optimizing functions in each divided area and efficient utilizations of overall space.

It might be difficult to assemble planks with jumbo sizes and weights in a realistic construction site including different in-situ conditions; moreover, lots of labors and technicians for a construction project should be recruited to set up jumbo planks effectively. Accordingly, a user has to spend more money on the end product due to a longer construction schedule and higher costs comparatively.

There have been several solutions in the prior art to settle the problem of assembling large and heavy planks. For example, vastly adopted lightweight materials as furniture, decoration or building materials could maintain some characteristics of their strengths and other functions with weight reductions for easy assembling but still barely satisfactory during time-consuming and laborious transportation, assembling and positioning of planks due to their bulky volumes.

Another solution for plank improvements in the prior art refers to a small-sized plank design through which a certain amount of planks are assembled for completion of a plank-based composition as required. This method significantly reducing difficulty in construction is praiseworthy because a single plank easily carried and operated is fast and conveniently assembled into a proper plank-based structure for different spatial configurations.

However, some problems existing in a composite plank-based structure mentioned above still need to be settled due to specific issues of construction:

1. Slow construction: The relative positions of multiple pieces of planks to be assembled requiring precisely close integrations delay accurate assembling of planks and costs much time.

2. Difficulty in maintaining durable quality: The distinct skill, proficiency and carefulness of a technician to assemble planks manually are critical to quality of a finished project; for example, planks on a large-scale plank wall or for a construction project to be implemented by several workers might be assembled inaccurately because of size errors.

Accordingly, lots of such drawbacks actually entailed by unsatisfactory design and construction method in the prior art deserve to be corrected.

With the drawbacks in the prior art taken into account, the patent applicant considers many factors, aggressively researching and developing a structure for fast stabilized positioning of relative locations and fastening, and completing a positioning and fastening system for a combination of planks and a method thereof after a long-term study and implementation.

SUMMARY OF THE INVENTION

The present disclosure is to offer a positioning and fastening system for combining planks which is simplified in structure and operating easily for a fast and effective combination of planks with same conditions by any operator.

The present disclosure is to offer a positioning and fastening system for combining planks wherein the planks constitute a finished product with reliable accuracy and strength for widespread applications.

The present disclosure is to offer a positioning and fastening system for combining planks through which construction time is effectively reduced, a finished product is critically acclaimed for its appearance smooth and well-done without further modification, and an operator's work efficiency increases significantly for fewer job costs.

To this end, the positioning and fastening system for combining planks in the present disclosure comprises the following components:

at least two planks, combined to form a block of wall, each of which has a junction surface at one end plane to contact with the other plank and a clamping surface at the other end plane wherein the junction surface on each of the planks is designed to have a positioning counterbored hole for positioning pin, the clamping surface on each of the planks is designed to have a pre-burying counterbored hole for nut opposite to the positioning counterbored hole, and both the positioning counterbore hole and the pre-burying counterbored hole allow a bolt hole to penetrate in between and to connect the two planks;

a positioning pin, which develops a bolt passage centrally and is buried in and between two positioning counterbored holes at the two planks to be joined by the junction surfaces to fix their relative position;

two nuts, each of which has a screw hole centrally and is inserted into and fixed in the pre-burying counterbored hole at each of the two planks; and a junction bolt, which has a specific design of the present disclosure and penetrates from the nut at anyone of the two planks and is fastened in the screw hole of the nut at the other plank through the bolt passage of the positioning pin.

Based on the above-described components for assembling, two selected planks are firstly moved with their junction surfaces to get closely-attached to each other fallowing a procedure that plugs a half of a positioning pin into the positioning counterbored hole at one of the two selected planks for positioning, then guides the positioning counterbored hole at the other planks sliding onto and surrounding the other half of the positioning pin. Then, a junction bolt is screwed into the pre-buried nut in the pre-burying counterbored hole opposite to the positioning pinned positioning counterbored hole at anyone of the two planks and screwed and fastened in the pre-buried nut at the other plank. Thus completes a fast and accurate combination of the two planks.

In the positioning and fastening system for a combination of planks, two planks featuring the identical shape and dimensions join together with those corresponding edges of them aligned to and tightly fitting each other; alternatively, two planks are able to join together with those corresponding edges of them unaligned to each other for a staggered type combination.

Each plank comprises more than one set of positioning counterbored hole, bolt passage, pre-burring counterbored hole to match positioning pins, pre-buried nuts and junction bolts.

The positioning counterbored hole has the diameter equal to or slightly greater than the outer diameter of the positioning pin and the depth slightly more than half of the length of the positioning pin in order to bury the positioning pin in the positioning counterbored hole smoothly; the bolt passage in the positioning pin features the diameter slightly greater than the outer diameter of a thread on the junction bolt for penetration of the junction bolt into the passage.

Moreover, each nut has its outer diameter slightly greater than the nut hole for a close fit between the nut and the nut hole; each nut comprises a skid/rotation-free unit at the outer diameter and a nut tab located at the tail end and embedded in the pre-burying counterbored hole wherein the nut tab comprises wrench fitting edges designed at lateral sides and properly occluded by a wrench with which each nut is screwed movably; the thread in the screw hole at each nut matches the thread of the junction bolt for effective occlusion in between.

The junction bolt has a thread at the front end and a cylindrical shank located at the rear end of the thread and featuring the diameter less than the inner diameter of the thread in the screw hole at each of the two nuts wherein the cylindrical shank of the junction bolt penetrates one nut as well as the positioning pin and is fastened in the other nut; moreover, the junction bolt has a bolt head located at the tail end and embedded in the pre-burying counterbored hole that features the diameter and the depth for operation of a bolt wrench inside.

Furthermore, each of the planks is provided with an L-shaped angle bar located at an edge and having a slender slot at the upper segment of the angle bar for penetration of a fastening bolt to be fastened on the plank and further a plurality of reserved holes at the lower segment of the angle bar through which the plank is fixed at a supporting structure after penetrations of coupling screws into the reserved holes.

The L-shaped angle bar, the fastening bolt and the coupling screws constitute a set of components to be installed on a lateral edge of the plank; and more than one set of them could be installed on a lateral edge side of the plank; alternatively, these sets of components could be installed on more than two lateral edge sides of the plank simultaneously.

Furthermore, each plank comprises a plurality of penetration holes therein, each of which is connected to an auxiliary positioning counterbored hole opened at the junction surface and accommodating the positioning pin for a better positioning function.

DETAILED DESCRIPTION OF THE PREFERRED EMBODIMENTS

A positioning and fastening system for a combination of planks comprises is demonstrated in the preferred embodiments and accompanying drawings for clear understanding of purposes, technical measures and advantages. The embodiments hereinafter are used to explain but not limit the present application.

Referring to FIG. 1 to FIG. 7, which illustrate a positioning and fastening system for a combination of planks comprises at least two planks 100 and a fastening module 200 wherein the fastening module 200 is used to join the two planks 100 and comprises a positioning pin 210, two nuts 220 and a junction bolt 230.

Each of the planks 100 has a junction surface 101 defined at one end plane for contacting the other plank 100 face to face and further a clamping surface 102 defined at the other end plane for penetration of the junction bolt 230 in a fastening step. Each of the planks 100 is designed to have a positioning counterbored hole 110 opened on the junction surface 101 for placement of the positioning pin 210 in a positioning step; each of the planks 100 is also designed to have a pre-burying counterbored hole 130 opened on the clamping surface 102 and relative to the positioning counterbored hole 110 for placements of the nut 220 and the junction bolt 230, both of which are buried in the plank 100; the positioning counterbored hole 110 and the pre-burying counterbored hole 130 allow a nut hole 120 to penetrate in between such that the nut 220 is inserted into the nut hole 120.

The positioning pin 210 is buried between the two positioning counterbored holes 110 for positioning the two planks 100 which correspond to each other and depend on individual junction surfaces 101 for a combination; the positioning pin 210 develops a passage 211 inside for penetration of the junction bolt 230.

Each of the two nuts 220 is inserted into and fixed in the nut hole 120 on one of the two planks 100 and designed to have a screw hole 221 centrally in which the junction bolt 230 is screwed for penetrating the nut 220 from each of the two planks 100 and fastening inside the screw hole 221 of the other nut 220 through the passage 211 of the positioning pin 210 such that the two planks 100 are fastened and coupled with each other.

A positioning and fastening system for a combination of planks in the present disclosure depends on the above components for a fast and accurate combination of any two planks 100. In the beginning, the two selected planks 100 rely on individual junction surfaces 101 to get close to each other such that the positioning counterbored holes 110 inside the two planks 100 are aligned to each other for accommodating the positioning pin 210 inside a space formed in the two positioning counterbored holes 110 in a positioning step; the nut 220, which can be placed inside a plank 100 directly by a manufacturer or in a combination process later, is inserted into the nut hole 120 inside each of the two planks 100 and the junction bolt 230 inserted from the pre-burying counterbored hole 130 on each of the planks 100 passes through both the nut 220 in the direction of the junction bolt 230 inserted and the positioning pin 210 and is fixed in the nut 220 in the opposite direction for completing a combination of the two planks 100.

Figure 1:
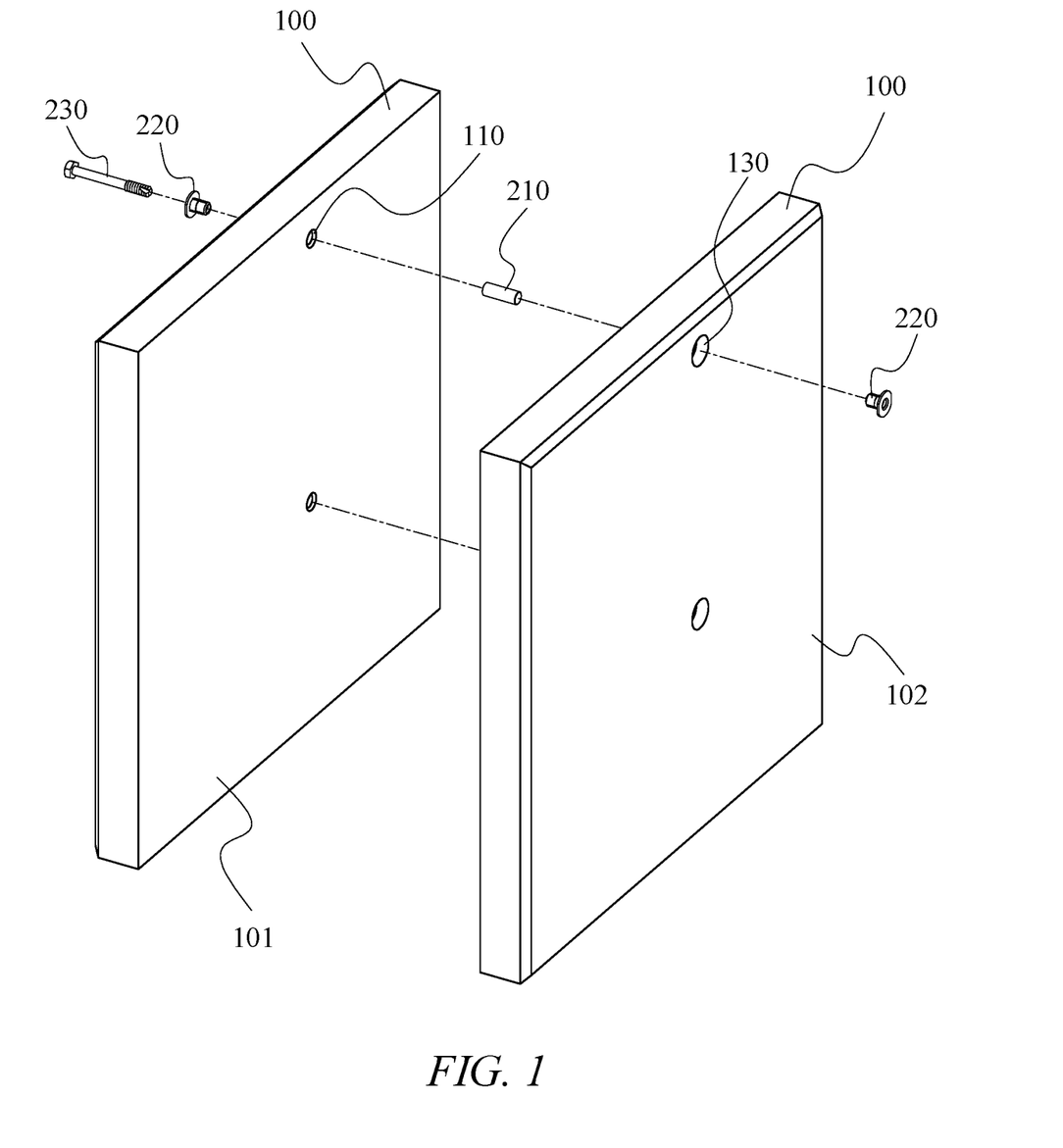
FIG. 1 is a perspective exploded view of a positioning and fastening system for a combination of planks.
Figure 2:
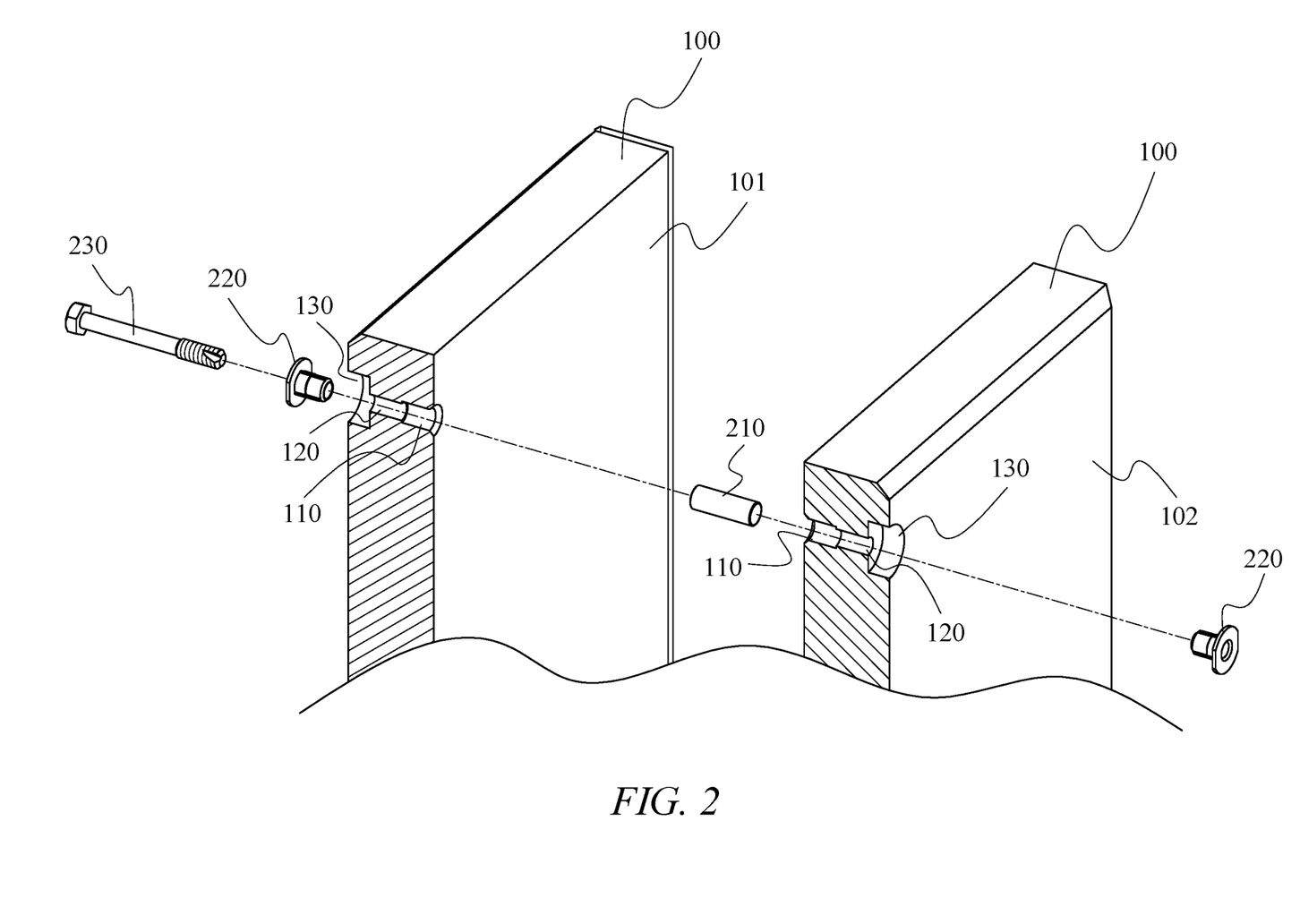
FIG. 2 is a partial perspective enlarged section view of the positioning and fastening system.
Figure 3:
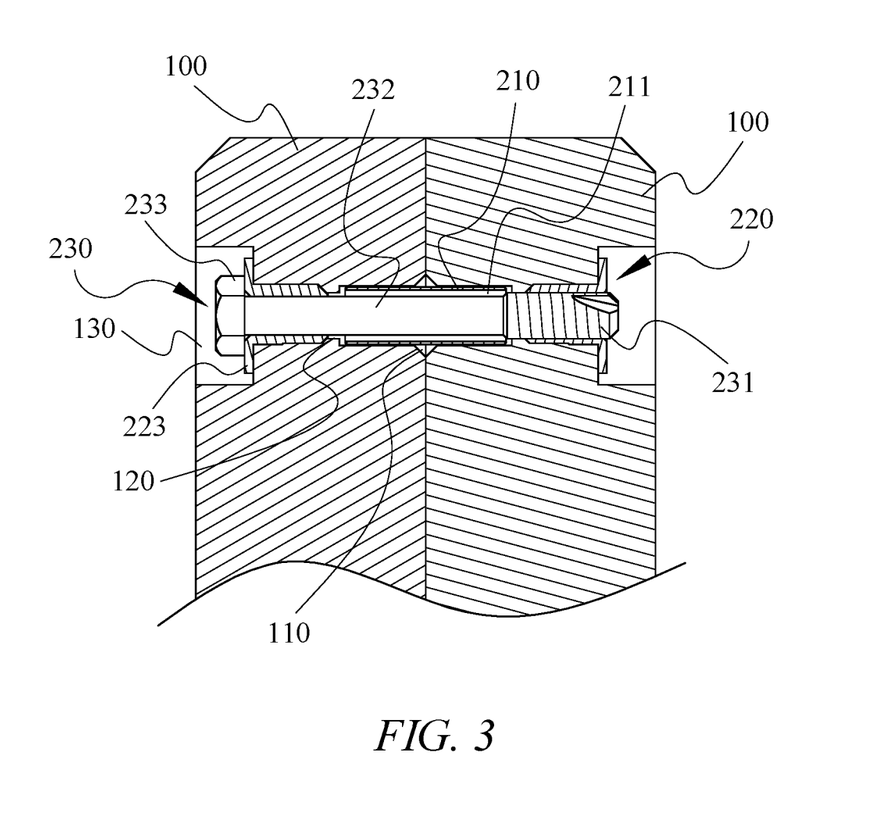
FIG. 3 is an enlarged plan and section view of the positioning and fastening system.
Figure 4:
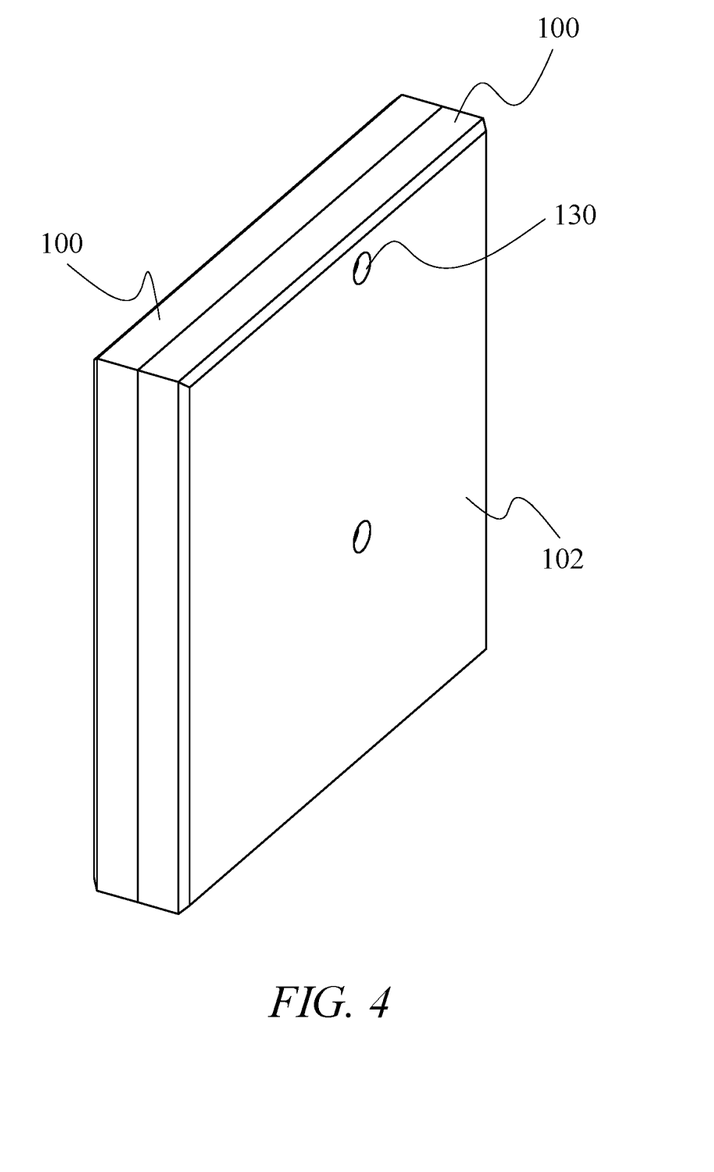
FIG. 4 is a perspective view of the positioning and fastening system which has been assembled.
Figure 5:
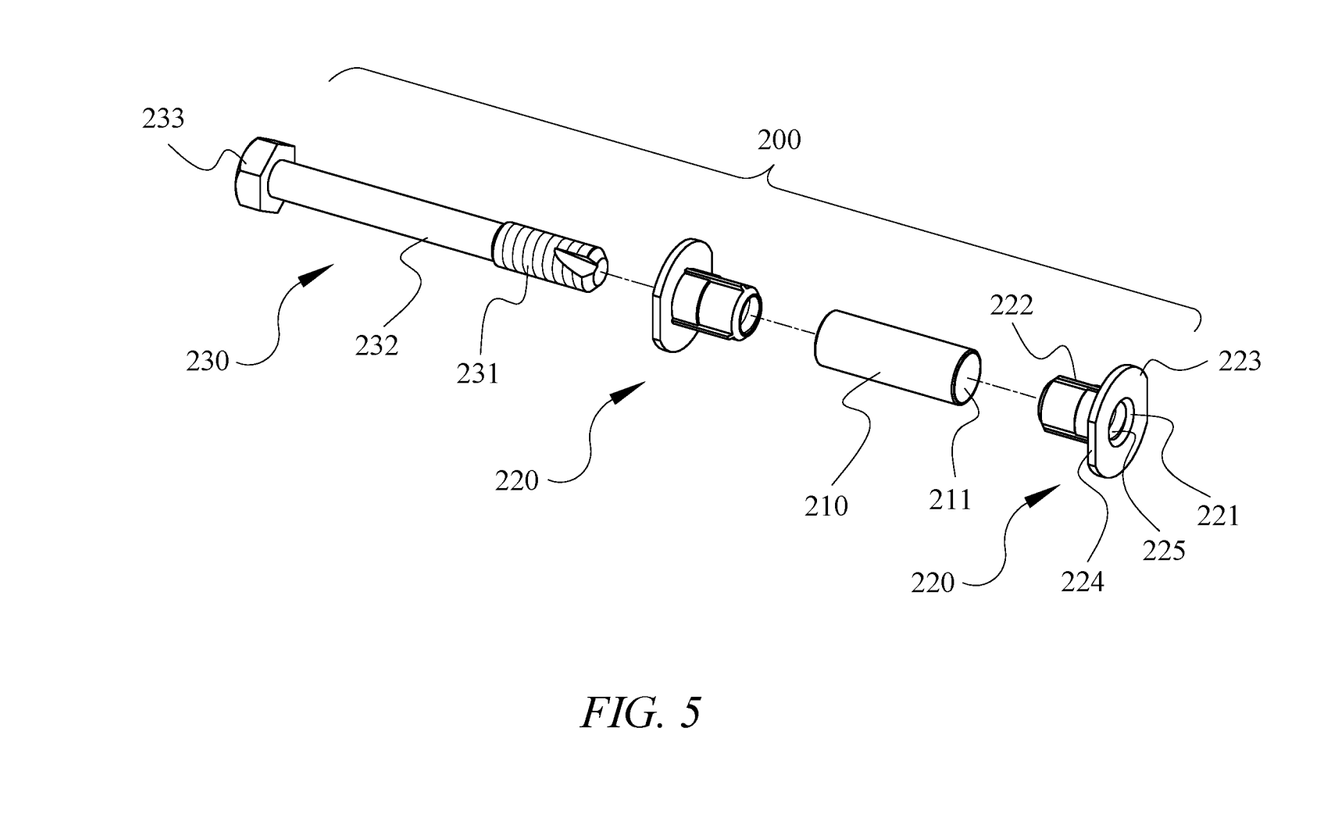
FIG. 5 is a perspective exploded view of a set of fastening module components in the positioning and fastening system.
Figure 6:
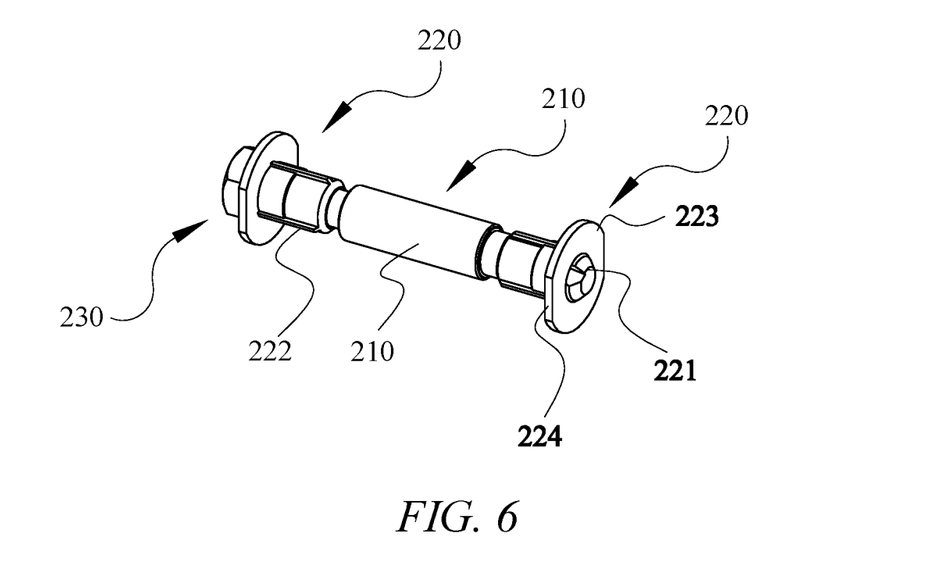
FIG. 6 is a perspective view of the fastening module which has been assembled.
Figure 7:
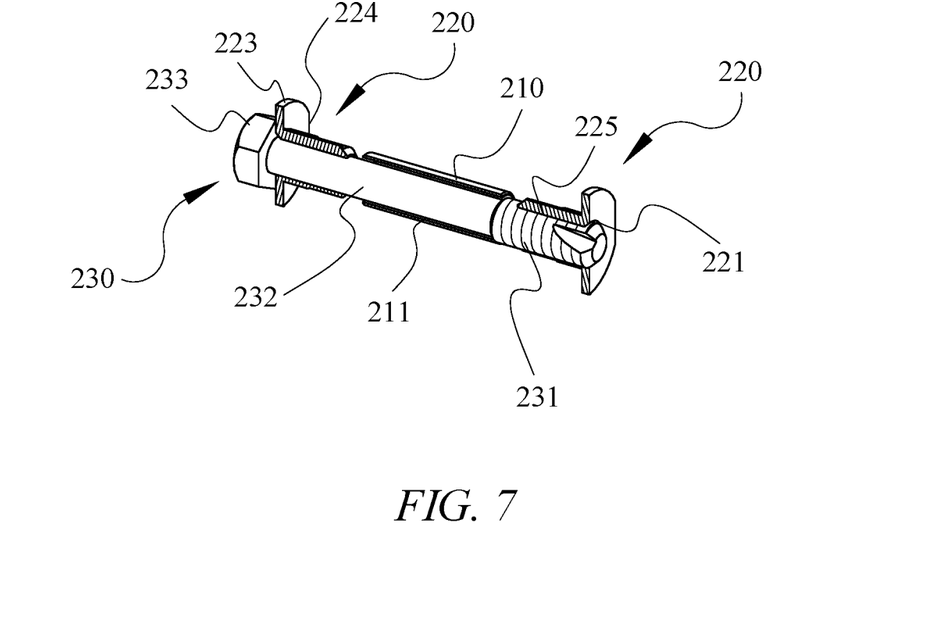
FIG. 7 is a partial perspective section view of the fastening module.
Figure 8:
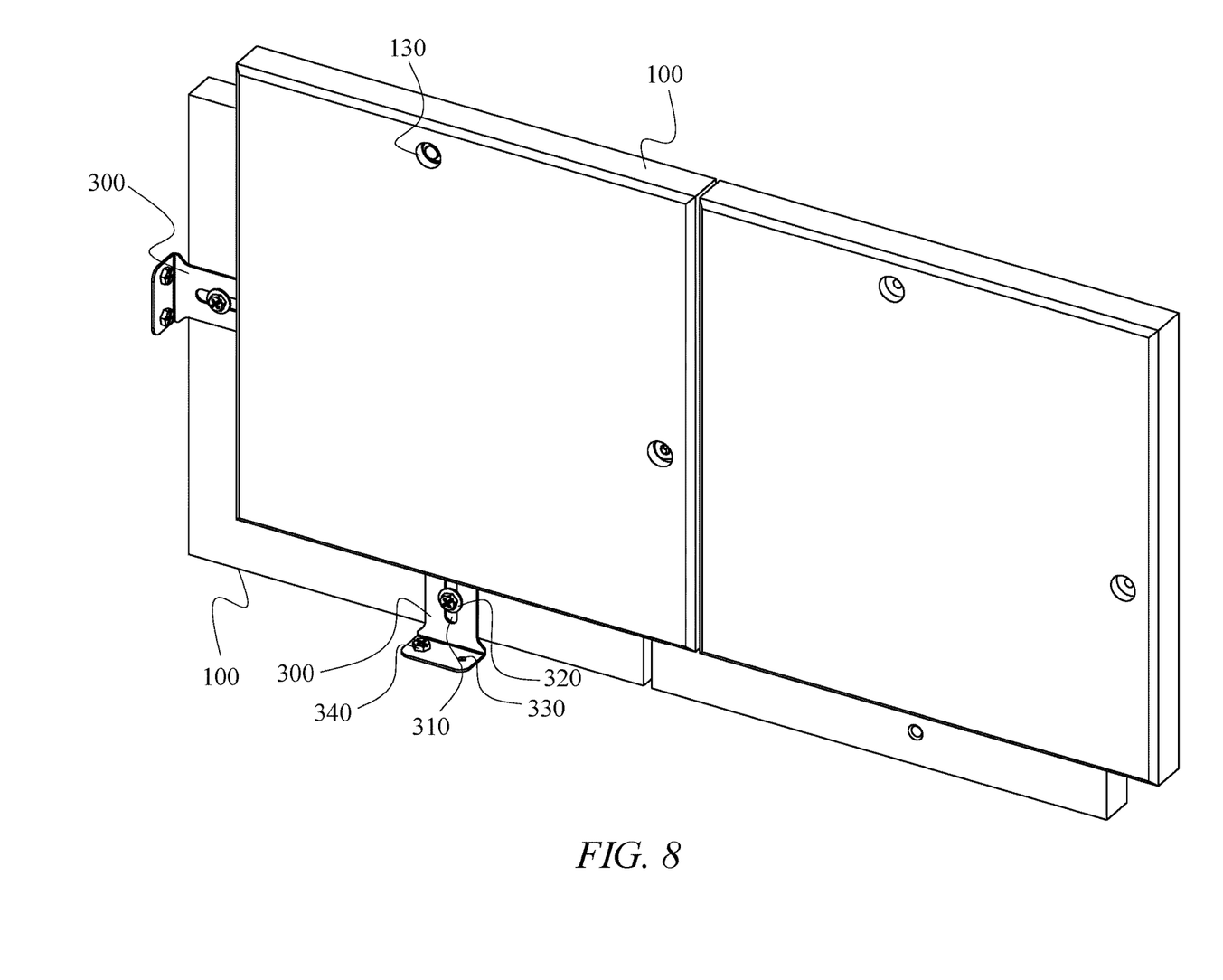
FIG. 8 is a perspective view of the positioning and fastening system with L-shaped angle bars which has been assembled.

The two planks 100 featuring the identical shape and dimensions join together with those corresponding edges aligned to and tightly fitting each other. Alternatively, as shown in FIG. 8, any two planks 100 in which one plank 100 is combined with but separated from the other plank 100 are stacked and fastened in a construction method of staggered combination for an adjustment as required; definitely, the positioning counterbored holes 110, the nut holes 120 and the pre-burying counterbored holes 130 on the planks 100 should be matched properly in advance.

There are more than one positioning counterbored hole 110 to match the positioning pin 210, more than one nut hole 120 to match the nut 220, and more than one pre-burying counterbored hole 130 to match the junction bolt 230 designed on each of the planks 100. In general, there are at least two groups of positioning counterbored holes 110, nut holes 120 and pre-burying counterbored holes 130, both of which are deployed in a vertical, horizontal or diagonal direction for a stable combination of the two planks 100; alternatively, there might be more than two groups of positioning counterbore holes 110, nut holes 120 and pre-buried counterbore holes 130 designed on each of the planks 100 without limitation.

The positioning counterbored hole 110 has the diameter equal to or slightly greater than the outer diameter of the positioning pin 210 and the depth slightly more than half of the length of the positioning pin 210, that is, the positioning pin 210 is buried in a space with a length greater than the positioning pin 210 inside the positioning counterbored holes 110 smoothly after the two planks 100 join together.

Furthermore, the passage 211 in the positioning pin 210 features the diameter slightly greater than the outer diameter of a thread 231 on the junction bolt 230 such that the passage 211 is penetrated by the junction bolt 230.

Each of the two nuts 220 has the outer diameter slightly greater than the nut hole 120 for a close fit between the nut 220 and the nut hole 120 in which the nut 220 is fixed; each of the two nuts 220 comprises a skid/rotation-free unit 222 designed on the outer diameter and embedded into the plank 100 for further fixing the two nuts 220.

Each of the two nuts 220 comprises a nut tab 223 designed at the tail end, protruding from the nut hole 120 and embedded in the pre-burying counterbored hole 130; the nut tab 223 comprises wrench fitting edges 224 located at lateral sides and properly occluded by a specific wrench (not shown in figures) with which each of the two nuts 220 is pulled and adjusted movably; the thread 225 in the screw hole 221 at each of the two nuts 220 matches the thread 231 of the junction bolt 230 for effective occlusion in between.

A cylindrical shank 232 which extends from the rear end of the thread 231 on the junction bolt 230 has the diameter less than the inner diameter of the thread 225 in the screw hole 221 inside each of the two nuts 220. When the thread 231 on the junction bolt 230 is screwed into the nut 220 in the direction of forward motion of the junction bolt 230, the cylindrical shank 232 penetrates both the nut 220 and the positioning pin 210 and is fastened to the other nut 220 in the opposite direction. The junction bolt 230 comprises a bolt head 233 designed at the tail end, protruding from the 220 and embedded in the pre-burying counterbored hole 130 that features the diameter and the depth for operation of a bolt wrench (not shown in figures) inside during installation of the junction bolt 230.

Referring to FIG. 8, which illustrates a positioning and fastening system for a combination of planks is used in assembling a panel wall wherein each of the planks 100 is provided with an L-shaped angle bar 300 at an edge, the L-shaped angle bar 300 has a slender slot 310 at the upper segment for penetration of a fastening bolt 320 to be fastened on the plank 100, the L-shaped angle bar 300 also has a plurality of reserved holes 330 at the lower segment through which the plank 100 is fixed at a supporting structure of panel wall (not shown in FIG. 8) after penetrations of coupling screws 340 into the reserved holes 330, and the slender slot 310 is designed to change a distance between the plank 100 and the L-shaped angle bar 300 for an adjustable close fit of the panel wall.

In a positioning and fastening system for a combination of planks, the L-shaped angle bar 300, the fastening bolt 320 and the coupling screws 340 constitutes a set of components to be installed on a lateral edge side of the plank 100; more than one set of components could be installed on two lateral edge sides of the plank simultaneously and adjustably as required.

Figure 9:
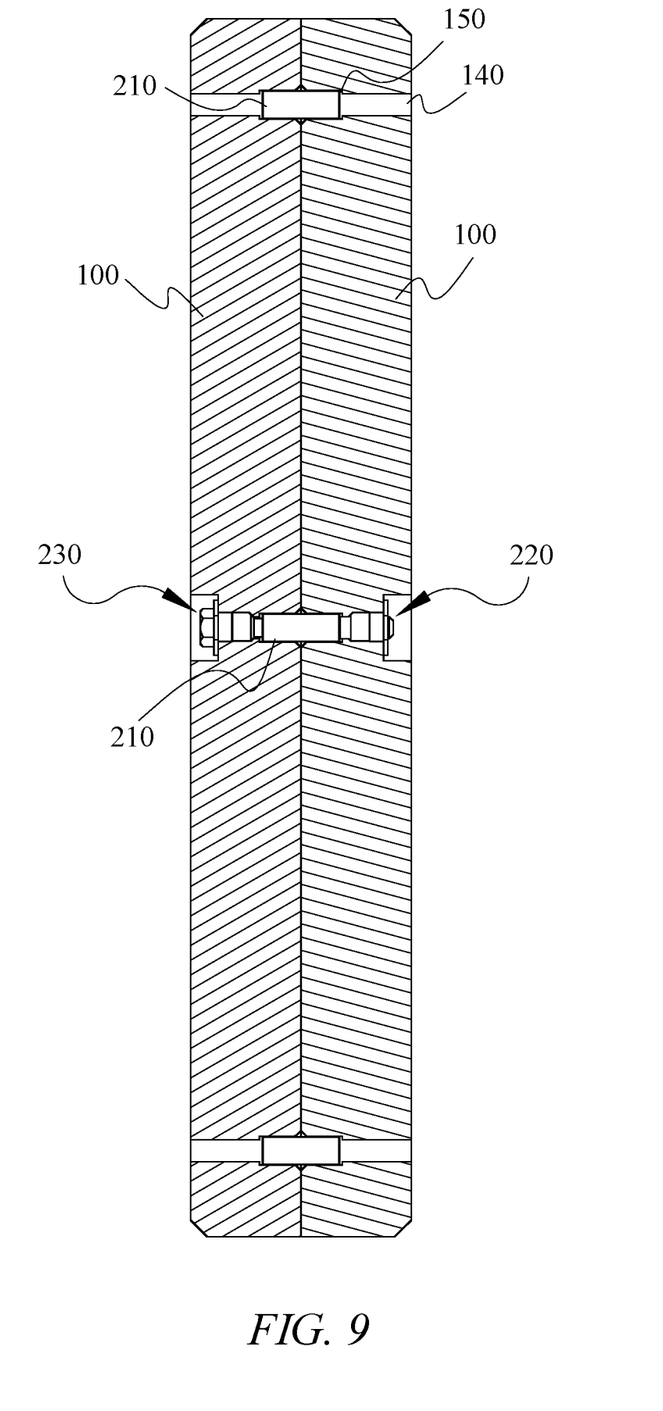
FIG. 9 is a plan and section view of the positioning and fastening system with auxiliary positioning counterbore holes.

Referring to FIG. 9, which illustrates each of the planks 100 comprises a plurality of penetration holes 140 thereon in general for accommodations of screws or pins during fastening or positioning. In the present disclosure, the positioning counterbored hole 110, the nut hole 120 and the pre-burying counterbored hole 130 are designed in each of the penetration holes 140 directly as required; alternatively, an auxiliary positioning counterbored hole 150 is connected to each of the partial penetration holes 140 at the junction surface 101 on which the penetration holes 140 are opened such that the positioning pin 210 is accommodated in the auxiliary positioning counterbored hole 150 for a better positioning function.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A positioning and fastening system for combining planks, comprising:
   two planks, combined to form a block of wall, each of which has a junction surface at one end plane to contact with the other plank and a clamping surface at the other end plane opposite the junction surface, wherein the junction surface on each of the planks includes a positioning counterbored hole, the clamping surface on each of the planks includes a pre-burying counterbored hole which houses a nut opposite to the positioning counterbored hole, and a bolt hole is configured between both the positioning counterbored hole;
   a positioning pin, which defines a bolt passage centrally and is buried in and between two positioning counterbored holes in the two planks at the junction surfaces to fix the relative positions of the two planks;
   two nuts, each of which has a screw hole centrally, each nut fixed in the pre-burying counterbored hole at each of the two planks; and
   a junction bolt, having a thread at a front end, a cylindrical shank located at a rear end of the thread, a bolt head located at a tail end, wherein the bolt head is embedded in a pre-burying counterbored hole that features a diameter and a depth allowing operation of a bolt wrench inside, the cylindrical shank of the junction bolt having a diameter less than the inner diameter of thread in the screw hole of each of the two nuts, and the front end thread penetrates one of the two nuts at one of the two planks, the bolt passage in the positioning pin, and fastens on the front end thread the screw hole of the other nut of the two nuts at the other plank.

2. The positioning and fastening system for combining planks as claimed in claim 1 wherein the planks feature the identical shape and dimensions.

3. The positioning and fastening system for combining planks as claimed in claim 1 wherein each of the planks comprises more than one group of the positioning counterbored hole to match the positioning pin, the pre-burying counterbored hole to match the nut and the bolt hole to match the junction bolt.

4. The positioning and fastening system for combining planks as claimed in claim 1 wherein the positioning counterbored hole has the diameter equal to or greater than the outer diameter of the positioning pin and the depth more than half of the length of the positioning pin in order to bury the positioning pin in the positioning counterbored hole and the bolt passage in the positioning pin features the diameter greater than the outer diameter of a thread on the junction bolt for penetration of the junction bolt into the passage.

5. The positioning and fastening system for combining planks as claimed in claim 1 wherein: each of the two nuts has the outer diameter greater than the nut hole for a close fit between the nut and the nut hole; each of the two nuts comprises a skid/rotation-free unit at the outer diameter and a nut tab located at the tail end and embedded in the pre-burying counterbored hole wherein the nut tab comprises wrench fitting edges designed at lateral sides and properly occluded by a wrench with which each of the two nuts is screwed movably; the thread in the screw hole at each of the two nuts matches the thread of the junction bolt for effective occlusion in between.

6. The positioning and fastening system for combining planks as claimed in claim 1 wherein each of the planks is provided with an L-shaped angle bar located at an edge and having a slender slot at the upper segment for penetration of a fastening bolt to be fastened on the plank and further a plurality of reserved holes at the lower segment through which the plank is fixed at a supporting structure after penetrations of coupling screws into the reserved holes.

7. The positioning and fastening system for combining planks as claimed in claim 6 wherein the L-shaped angle bar, the fastening bolt and the coupling screws constitute a set of components to be installed on a lateral edge side of the plank or more than one set of components could be installed on two lateral edge sides of the plank simultaneously.

8. The positioning and fastening system for combining planks as claimed in claim 6 wherein each of the planks comprises a plurality of penetration holes thereon, each of which is connected to an auxiliary positioning counterbored hole opened at the junction surface and accommodating the positioning pin for a better positioning function.

* * * * *